(12) United States Patent
Kim

(10) Patent No.: US 9,454,436 B2
(45) Date of Patent: Sep. 27, 2016

(54) ELECTRONIC DEVICE AND FIRMWARE UPGRADING METHOD THEREOF

(71) Applicant: Samsung Electronics Co., Ltd., Suwon-si (KR)

(72) Inventor: Byoung-chul Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 222 days.

(21) Appl. No.: 14/102,577

(22) Filed: Dec. 11, 2013

(65) Prior Publication Data

US 2014/0223160 A1 Aug. 7, 2014

(30) Foreign Application Priority Data

Feb. 4, 2013 (KR) ........................ 10-2013-0012555

(51) Int. Cl.
| | |
|---|---|
| *G06F 15/177* | (2006.01) |
| *G06F 11/14* | (2006.01) |
| *G06F 9/445* | (2006.01) |
| *H04N 21/435* | (2011.01) |
| *H04N 21/443* | (2011.01) |
| *H04N 21/458* | (2011.01) |
| *H04N 21/81* | (2011.01) |
| *H04N 21/835* | (2011.01) |
| *G06F 11/07* | (2006.01) |

(52) U.S. Cl.
CPC ............. *G06F 11/1417* (2013.01); *G06F 8/65* (2013.01); *G06F 11/0706* (2013.01); *G06F 11/0793* (2013.01); *H04N 21/4353* (2013.01); *H04N 21/4432* (2013.01); *H04N 21/4586* (2013.01); *H04N 21/818* (2013.01); *H04N 21/835* (2013.01); *G06F 2201/83* (2013.01)

(58) Field of Classification Search
CPC ... G06F 11/1417; G06F 8/65; G06F 2201/83
See application file for complete search history.

(56) References Cited

U.S. PATENT DOCUMENTS

| | | | |
|---|---|---|---|
| 7,080,243 B2 * | 7/2006 | Ramiz ....................... | G06F 8/65 713/1 |
| 7,673,297 B1 | 3/2010 | Arsenault et al. | |
| 8,230,210 B1 * | 7/2012 | Polyudov ................ | G06F 8/665 713/2 |
| 2002/0073304 A1 * | 6/2002 | Marsh ....................... | G06F 8/65 713/1 |
| 2002/0092008 A1 * | 7/2002 | Kehne .................. | G06F 11/1433 717/168 |
| 2002/0170050 A1 * | 11/2002 | Fiorella, III .............. | G06F 8/67 717/168 |

(Continued)

FOREIGN PATENT DOCUMENTS

| | | |
|---|---|---|
| EP | 2568639 A1 | 3/2013 |
| WO | 2012/024963 A1 | 3/2012 |

OTHER PUBLICATIONS

"A System and Method of Policy-Based Autonomous Firmware Update", IP.com Journal, May 3, 2012, 15 pages total.

(Continued)

*Primary Examiner* — Vincent Tran
(74) *Attorney, Agent, or Firm* — Sughrue Mion, PLLC

(57) ABSTRACT

A firmware upgrading method for an electronic device is provided. The electronic device includes a storage section which stores a firmware image and a controller which executes a boot loader of the electronic device to determine whether the firmware image is damaged, performs a restoration function for the firmware image if the firmware image is damaged, and executes an operating system (OS) to perform normal operations if the firmware image is not damaged.

15 Claims, 8 Drawing Sheets

(56) References Cited

U.S. PATENT DOCUMENTS

| | | | | |
|---|---|---|---|---|
| 2003/0236970 A1* | 12/2003 | Palmer | G06F 8/65 | 713/1 |
| 2004/0030877 A1* | 2/2004 | Frid | G06F 8/665 | 713/1 |
| 2004/0076043 A1* | 4/2004 | Boals | G06F 11/1417 | 365/200 |
| 2004/0255286 A1* | 12/2004 | Rothman | G06F 8/65 | 717/168 |
| 2006/0075276 A1* | 4/2006 | Kataria | G06F 8/65 | 714/47.1 |
| 2008/0235501 A1* | 9/2008 | Bailey | G06F 11/1417 | 713/1 |
| 2009/0112941 A1* | 4/2009 | Lo | G06F 11/0793 | |
| 2009/0249120 A1* | 10/2009 | Yao | G06F 11/1417 | 714/15 |
| 2010/0199078 A1* | 8/2010 | Shih | G06F 8/65 | 713/2 |
| 2010/0235617 A1* | 9/2010 | Chen | G06F 11/1433 | 713/2 |
| 2011/0126043 A1 | 5/2011 | Anderson et al. | | |
| 2011/0126044 A1 | 5/2011 | Kim et al. | | |
| 2011/0131447 A1* | 6/2011 | Prakash | G06F 21/572 | 714/19 |
| 2011/0276724 A1* | 11/2011 | Mullis, II | G06F 8/65 | 710/8 |
| 2011/0302572 A1* | 12/2011 | Kuncoro | G06F 8/66 | 717/171 |
| 2012/0110379 A1* | 5/2012 | Shao | G06F 11/1417 | 714/15 |
| 2012/0124568 A1* | 5/2012 | Fallon | G06F 8/665 | 717/169 |
| 2012/0324211 A1* | 12/2012 | Chen | G06F 9/541 | 713/1 |
| 2013/0013906 A1* | 1/2013 | Brown | G06F 21/575 | 713/2 |
| 2013/0111455 A1 | 5/2013 | Li et al. | | |
| 2013/0179872 A1* | 7/2013 | Kuzmack | G06F 8/665 | 717/173 |

OTHER PUBLICATIONS

Communication dated May 12, 2014, issued by the European Patent Office in counterpart European Application No. 13195086.7.

Communication dated Apr. 6, 2016 issued by the European Patent Office in counterpart European Patent Application No. 13195086.7.

* cited by examiner

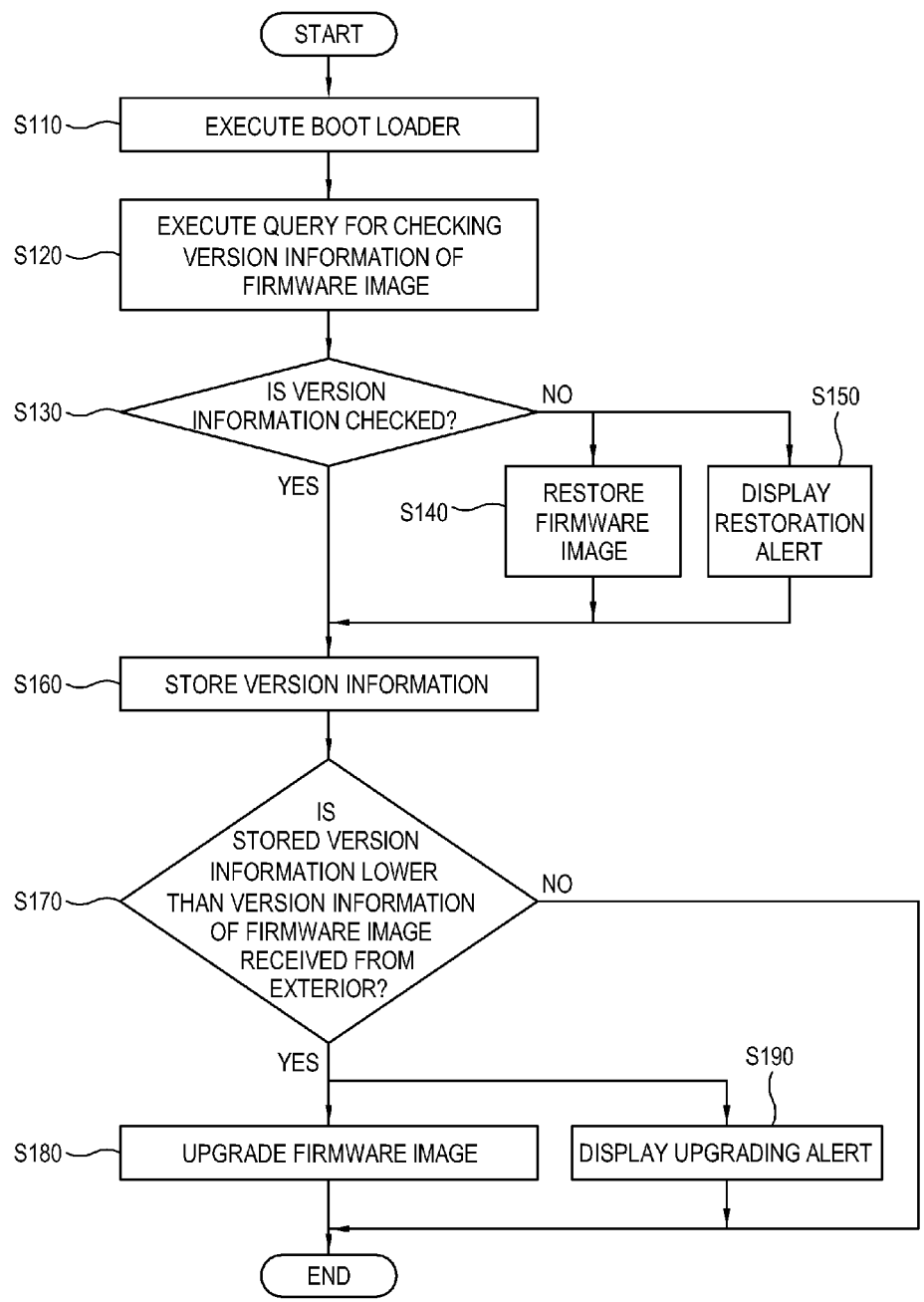

ELECTRONIC DEVICE AND FIRMWARE UPGRADING METHOD THEREOF

CROSS-REFERENCE TO RELATED APPLICATION

This application claims priority from Korean Patent Application No. 10-2013-0012555, filed on Feb. 4, 2013 in the Korean Intellectual Property Office, the disclosure of which is incorporated herein by reference.

BACKGROUND

1. Field

Apparatuses and methods consistent with the exemplary embodiments relate to an electronic device and a firmware upgrading method thereof, and more particularly to an electronic device and a firmware upgrading method in which a firmware image required for operating the electronic device can be restored or upgraded.

2. Description of the Related Art

Generally, firmware refers to a micro-program for controlling hardware stored in a read only memory (ROM). From a program point of view, the firmware is equal to software but different from general application software since it is closely related with hardware. Thus, the firmware has characteristics of both software and hardware.

A related art digital electronic device operates using the firmware. In the case of a digital television (DTV) and a digital broadcasting receiver such as a set-top box, microcontroller units (MCU) for controlling respective components performing functions of an infrared (IR) module, a graphic card, video and audio codec, a wireless fidelity (Wi-Fi) module, etc. may operate based on the firmware. In this case, a manufacturer or a user of the digital electronic device replaces the firmware instead of replacing the hardware of the respective components, so that the improved function of the firmware can be performed.

A firmware image of the digital electronic device may be partially damaged by various external factors such as an electric shock or the like. In this case, the damaged firmware image can be restored through rewriting with a firmware image received from an external source by an over-the-air (OTA) method. Also, a firmware image having a higher version than the firmware image being currently used with regard to a certain component may be received to upgrade the current firmware image.

While the firmware image is restored from damage or upgraded to a higher version, the component operating based on the corresponding firmware image cannot operate normally. Therefore, it has been typical of a related art electronic device to perform a normal operation after the firmware image is completely restored or upgraded, and thus a problem arises in that normal service provided through the electronic device is interrupted while restoring or upgrading the firmware image.

Also, in consideration of security of the firmware image to be upgraded, there is a need to determine whether contents of data have been changed. However, when the firmware image is received by the related art OTA method, there is no way to determine whether it is provided from a legal source. Accordingly, the related art OTA method is vulnerable to hacking.

SUMMARY

One or more exemplary embodiments may provide an electronic device and a firmware upgrading method thereof, which can assure security and minimize a service interruption time when a firmware image required for operations of the electronic device is restored or upgraded.

The foregoing and/or other aspects of the exemplary embodiments may be achieved by providing an electronic device including: a storage section configured to store a firmware image; and a controller configured to execute a boot loader of the electronic device to determine whether the firmware image is damaged, perform a restoration function for the firmware image if the firmware image is damaged, and execute an operating system (OS) to perform normal operations if the firmware image is not damaged.

According to an aspect of another exemplary embodiment, the electronic device may further include a plurality of components configured to perform functions of the electronic device, and the storage section may store the firmware images respectively corresponding to the plurality of components, and the controller may perform the restoration function for the damaged firmware image during a booting stage if at least one of the firmware images corresponding to the components is damaged.

According to an aspect of another exemplary embodiment, the controller may execute a query for checking version information of the firmware image, and determine that the firmware image is damaged if there is no response to the query.

According to an aspect of another exemplary embodiment, the controller may store the version information in the storage section when the version information of the firmware image is checked, compare the version information of the firmware image stored in the storage section with the version information of the firmware image received from an external source, and upgrade the firmware image with the firmware image received from the external source when the version information of the firmware image stored in the storage section is lower than the version information of the firmware image received from the external source.

According to an aspect of another exemplary embodiment, the electronic device may further include a communication section configured to communicate with an external server which provides the firmware image.

According to an aspect of another exemplary embodiment, the firmware image may be upgraded while the OS is running.

According to an aspect of another exemplary embodiment, the firmware image may include a hash value obtained from the firmware image through a hash function, and a digital signature of the hash value.

According to an aspect of another exemplary embodiment, the controller may decrypt the digital signature to determine whether the digital signature for the hash value is legal, and upgrade the firmware image stored in the storage section with the firmware image provided from the server if the digital signature is illegal.

According to an aspect of another exemplary embodiment, the electronic device may further include a display section which displays an image based on a video signal, and the controller may control the display section to display a user interface (UI) for informing that the restoration function for the firmware image is performed.

According to an aspect of another exemplary embodiment, the electronic device may further include: a receiver configured to receive a video signal; a transmitter configured to process and transmit the received video signal to a display device; and an alerting section configured to provide an alerting function when the restoration function for the firmware image is performed or when the firmware image is upgraded.

The foregoing and/or other aspects of the exemplary embodiments may be achieved by providing a firmware upgrading method of an electronic device, the method including: executing a boot loader; determining whether a firmware image is damaged; performing a restoration function for the firmware image when the firmware image is damaged; and executing an operating system (OS) to perform normal operations if the firmware image is not damaged.

According to an aspect of another exemplary embodiment, the electronic device may include a plurality of components configured to perform functions of the electronic device, and store firmware images respectively corresponding to the components, the performing the restoration function for the firmware images may include performing the restoration function for the damaged firmware image if at least one of the firmware images corresponding to the components is damaged.

According to an aspect of another exemplary embodiment, the determining whether the firmware image is damaged may include executing a query for checking version information of the firmware image; and determining that the firmware image is damaged if there is no response to the query.

According to an aspect of another exemplary embodiment, the version information is stored when the version information of the firmware image is checked.

According to an aspect of another exemplary embodiment, the firmware upgrade method may further include: comparing the version information of the firmware image stored in the electronic device with the version information of the firmware image received from an external source, and upgrading the firmware image with the firmware image received from the external source when the version information of the firmware image stored in the storage section is lower than the version information of the firmware image received from the external source.

According to an aspect of another exemplary embodiment, the upgrading the firmware image may be performed while the OS of the electronic device is running.

According to an aspect of another exemplary embodiment, the firmware image may include: a hash value obtained from the firmware image through a hash function; and a digital signature of the hash value.

According to an aspect of another exemplary embodiment, the upgrading the firmware image may be performed by determining whether the digital signature for the hash value is legal after decrypting the digital signature, and upgrading the firmware image stored in the storage section with the firmware image provided from the server if the digital signature is illegal.

According to an aspect of another exemplary embodiment, the firmware upgrade method may further include displaying information that the restoration function for the firmware image is performed or that the firmware image is upgraded.

BRIEF DESCRIPTION OF THE DRAWINGS

The above and/or other aspects will become apparent and more readily appreciated from the following description of exemplary embodiments, taken in conjunction with the accompanying drawings, in which:

FIGS. 5 and 6 are flowcharts of firmware upgrading methods for an electronic device according to an exemplary embodiment.

DETAILED DESCRIPTION OF EXEMPLARY EMBODIMENTS

Figure 1:
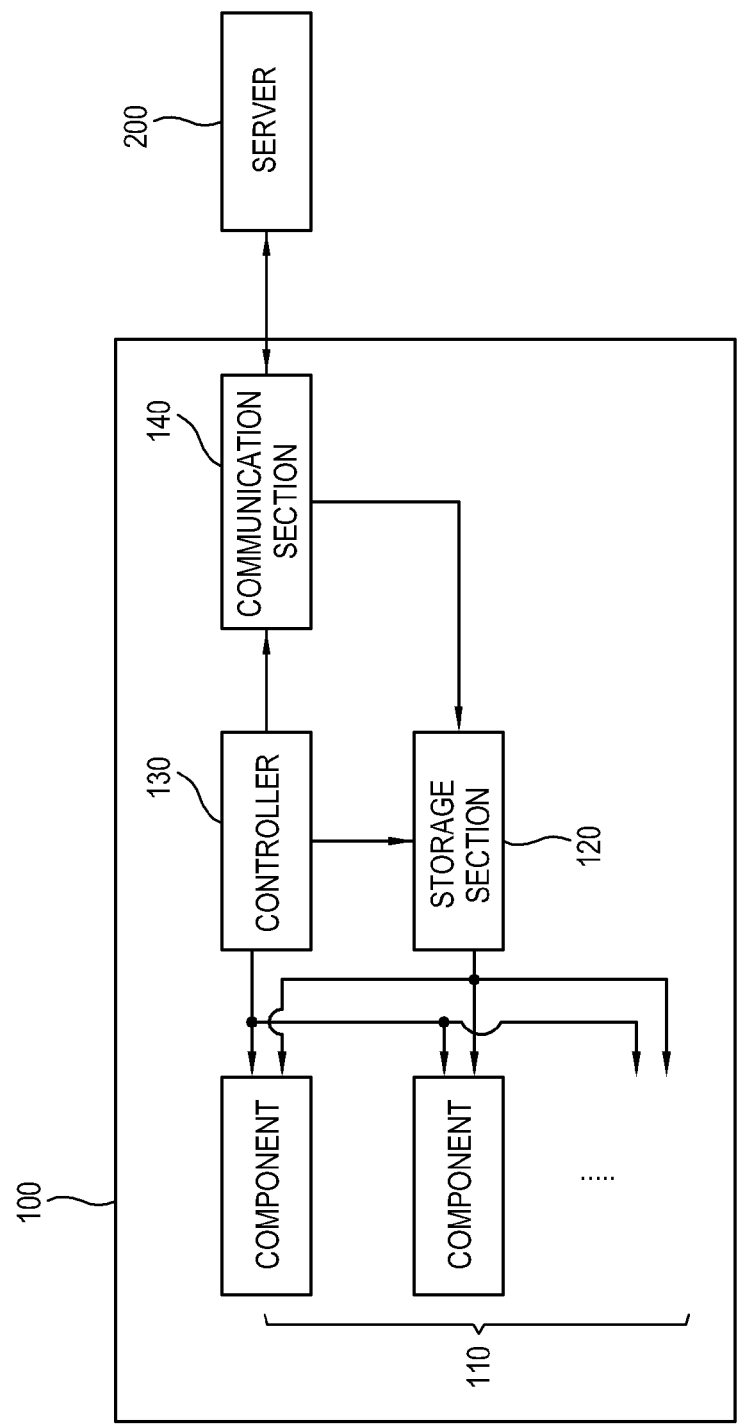
FIG. 1 is a control block diagram of an electronic device according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a control block diagram of an electronic device 100 according to an exemplary embodiment.

As shown therein, the electronic device 100 according to an exemplary embodiment includes a plurality of components 110, a storage section 120, a controller 130, and a communication section 140. The electronic device 100 may include any publicly known digital electronic device that operates using the firmware. Representatively, electronic device 100 may be a set-top box for receiving digital broadcasting, and a display apparatus such as a digital television (DTV), etc. for displaying a video signal. The electronic device may also be a publicly known digital electronic device such as a general personal computer (PC), a notebook computer, a Netbook computer, a smartbook, a mobile terminal, a personal digital assistant (PDA), a digital video recorder (DVR), etc.

The electronic device 100 includes a plurality of components 110 performing respective functions of the electronic device 100. The components 110 according to an exemplary embodiment may include an infrared (IR) module, a graphic card, a video and audio codec, a Wi-Fi module, etc. by way of example. The components 110 may include micro controller units (MCU) for controlling their functions, respectively, and each MCU may operate through a firmware image. The respective elements of the electronic device 100 such as the plurality of components 110, the storage section 120, the controller 130, etc. to be described later may be connected through a system bus such as, but not limited to, a Peripheral Component Interconnect (PCI) bus, a universal serial bus (USB) bus, an integrated development environment (IDE) bus, an accelerated graphics port (AGP) bus, a serial advanced technology attachment (SATA) bus and an institute of electrical and electronics engineers (IEEE) 1394 bus and transmit and receive various control signals and data.

The storage section 120 stores the firmware image. The storage section 120 according to an exemplary embodiment may include a publicly known memory which stores and reads data, and which may be configured by a hardware combination of a plurality of memories. In light of storing the firmware image, one memory may be used to store all the firmware images of the plurality of components 110, or a plurality of memories may be used to store firmware images included in the plurality of components 110, respectively. Here, the firmware image may be achieved by a nonvolatile memory such as a flash memory and a read only memory, and the storage section 120 may further include a separate memory such as a boot ROM for storing a boot roader image.

Figure 2:
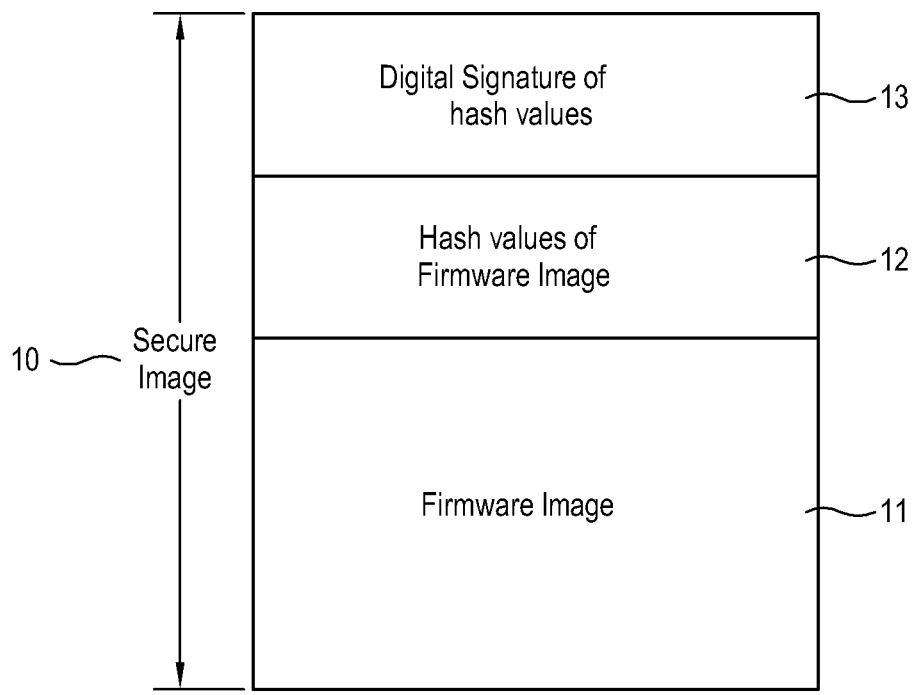
FIG. 2 shows a structure of a firmware image according to an exemplary embodiment.

According to this exemplary embodiment, the firmware image stored in the storage section 120 is configured by padding a separate code to assure security, which will be described with reference to FIG. 2.

The controller 130 performs general control for operations of the electronic device 100, and particularly performs restoring or upgrading control for the firmware image. The controller 130 may include a volatile memory such as a random access memory for loading a stored control program, and a microprocessor such as a central processing unit (CPU) or the like for executing the loaded control program. In this exemplary embodiment, the controller 130 performs general control for operations of the electronic device 100, and on the other hand the plurality of components 110 may separately include a microcontroller.

If the electronic device 100 is powered on, the controller 130 executes the boot loader stored in the storage section 120, i.e., stored in the boot ROM (not shown) and enters a booting stage. The execution of the booting stage may be controlled by a basic input/output system (BIOS), and identify, test and initialize the plurality of components 110 currently included in the electronic device 100 and external devices connected thereto.

The controller 130 determines whether the stored firmware image is damaged or not in the booting stage, and performs a restoring function for the firmware image if the firmware image is damaged. Hereinafter, an operation mode for restoring the damaged firmware image in the booting stage will be called an emergency restoration mode.

The firmware image stored in the storage section 120 may be damaged in some codes due to an external factor such as an external electric shock. In the case where the firmware image is damaged, for example, when the firmware image of the IR module is damaged, an IR signal received from a remote controller may be poor or may be analyzed differently from an original intention. Thus, the component operated by the damaged firmware image cannot perform a normal operation. Therefore, the controller 130 rewrites the damaged firmware image in the booting stage, and restores it into a normal firmware image.

The electronic device 100 may receive the firmware image for restoring the damaged firmware image through an over-the-air (OTA) method, and thus include a communication section 140 performing wired/wireless communication with an external server to receive the firmware image. This will be described later.

As an example of determining whether the firmware image is damaged or not, the controller 130 executes a query for checking version information of the firmware image, and determines that the firmware image is damaged if there is no response to the query. Here, the query is always implemented as a part of the booting stage when the boot loader is executed, and it is thus possible to enter an operating system (OS) stage after determining whether the firmware image is damaged or not in the booting stage of the electronic device 100.

The version information may be included in a header when the firmware image is configured. If there is no response to a version information query, the lack of a response may be caused by inoperativeness due to damage in the firmware image or an upgrading failure during upgrading. That is, the controller 130 may instantly enter the emergency restoration mode when the version information is not checked, and restore the firmware image.

On the other hand, if the version information is checked, the controller 130 may store the version information in a separate area of the storage section 120 to upgrade the firmware image in the following OS stage.

In the case where the emergency restoration mode is carried out in the booting stage, the controller 130 operates through a single thread. That is, under the emergency restoration mode, other operations are not performed until the firmware image is completely restored. After the emergency restoration is completed, the OS is loaded. After entering the OS stage, the electronic device 100 can perform normal operations.

When the emergency restoration for the firmware image is completed, or when there is no damage in the firmware images of all the components 110, the controller 130 loads an operating system (OS) stored in the storage section, thereby entering the OS stage. After entering the OS stage, the controller 130 controls the firmware image to be upgraded, in which an operation mode for upgrading the firmware image in the OS stage will be called an upgrading mode.

The controller 130 compares the version information of the firmware image stored in the storage section 120 with the version information of the firmware image received from the external source, and performs control to enter the upgrading mode if the version information of the firmware image stored in the storage section 120 is lower than the version information of the firmware image received from the external source. The electronic device 100 according to an exemplary embodiment may further include the communication section 140 which receives the firmware image from the external source through the OTA method. The communication section 140 may be a communication module which performs wired/wireless communication with the server which transmits the firmware image. The external server may be managed by a provider or manager of the electronic device 100, and transmits the version information of the firmware image and the firmware image to the electronic device 100 in accordance with requests from the electronic device 100.

In the OS stage, the electronic device 100 can perform its own operations normally. If the electronic device 100 is a set-top box, original functions of the set-top box such as receiving, processing, transmitting, etc. of a video signal are not performed as a result of identifying and initializing each component 110 in the booting stage, but performed after the OS is normally loaded. In this exemplary embodiment, the upgrading mode is implemented in the OS stage. In the OS stage, operations can be processed through multi threads. Therefore, while upgrading a firmware image of a certain component, the set-top box can carry out its own functions.

The controller 130 can perform an automatic restoration function for the firmware image after entering the OS stage. In the OS stage, a hash value of the firmware image of the component being currently operated is calculated, and the firmware image may be rewritten with a firmware image received from the server if the calculated hash value is not equal to a previously stored hash value. In this case, like the upgrading mode, the operations can be processed through the multi threads in the OS stage, and it is thus possible to further enhance service availability of the electronic device 100. Exemplary embodiments where the hash value of the firmware image is inspected will be described in detail later.

In a related art electronic device, both an emergency restoration function generally performed when the firmware image is damaged and a function of upgrading the version of the firmware image have been performed in the booting stage. That is, in the related art, when the boot loader is executed and then the identification and the initialization of the component 110 are performed by the BIOS, it has been determined whether the firmware image of the component is damaged or whether there is a need of updating a new version, and then the emergency restoration function and the upgrading functions are performed. Thus, booting time is so long that it takes a great amount of time for the electronic device to enter the OS stage and provide a normal service.

The electronic device 100 according to an exemplary embodiment uses the booting stage to enter the emergency restoration mode when the firmware image is damaged, and uses the OS stage to upgrade the version of the firmware image, so that the emergency restoration mode and the upgrading mode can be performed in a dual or synchronized manner, thereby reducing a service interruption time of the electronic device 100.

Below, a code configuration of the firmware image according to an exemplary embodiment will be described with reference to FIG. 2, and a configuration including a code for assuring the security of the firmware image will be called a secure image.

The secure image 10 includes a firmware image 11, a hash value 12 of the firmware image 11 obtained using a hash function, and a digital signature 13 of the hash value 12 of the firmware image 11.

The hash function is a function for mapping a code having a predetermined length to a code having a fixed length, in which an algorithm such as a secure hash algorithm (SHA)-1, a SHA-256, a MD4, a MD5, a HAVAL, etc. If the hash values are obtained from different codes though the hash function, mapping to the same hash value is almost impossible. Therefore, the hash function may be used for identifying the code.

The digital signature 13 is signed with a private key of a provider of the firmware image through a public key based structure, in which not the whole firmware image 11, but contents of the hash value 12 of the firmware image are generated by signature.

Meanwhile, the controller 130 of the electronic device 100 may perform a validity verification process of the secure image 10 stored in the storage section 120 or the secure image 10 received from the external server. With a public key provided from a provider of the secure image through the public key based structure, the controller 130 determines whether the digital signature is legally signed by the private key of the provider of the secure image 10. This will be performed through the verification process based on a well-known public key encryption method, and detailed descriptions thereof will be omitted.

Through the foregoing process, it is possible to verify whether the secure image 10 is an image provided by a provider of the secure image via a legal route. If the digital signature is illegal, it is determined that the corresponding secure image 10 is not provided from a legal route, but is instead provided from a hacking site or the like.

If the secure image 10 is legal, the hash value of the firmware image is obtained and then it is determined whether the hash value is a legal hash value. As described above, it is impossible that the hash values of different codes are mapped to the same hash values. Therefore, by comparison between the hash value separately received from the provider of the secure image, or previously stored, and the hash value of the firmware image, it is possible to verify whether the corresponding firmware image is not modified or modulated but is instead an original firmware image. The foregoing process of inspecting the hash value may be applied even when the automatic restoration mode operates in the OS stage.

By the above method, if the digital signature is illegal or the identity of the hash value of the firmware is not accepted, the controller 130 requests the provider of the secure image to transmit the secure image 10 again, and repetitively applies the verification process to the secure image 10, thereby replacing the existing secure image with the verified secure image.

A related art secure image is a value signed with respect to the whole firmware image, and thus it takes much time because the controller 130 has to read the whole area of the firmware image in order to perform the verification process of the firmware image. However, according to an exemplary embodiment, the digital signature is generated with regard to not the whole of the firmware image but the hash value of the firmware image, so that the verification can be performed as described above by reading the hash value of the shorter code, thereby reducing the time taken as compared with that of a related art case.

In the foregoing exemplary embodiment, it is possible to assure the security of the firmware image and further secure a service providing time of the electronic device 100. The following table 1 shows measured times taken during the booting stage and until the firmware image is completely restored or upgraded after the electronic device 100 is powered on. Here, the secure image process indicates a general process for restoring or upgrading the firmware image after reading the firmware image through the electronic device 100.

TABLE 1

|  | Secure Image Process | Without Secure Image Process |
|---|---|---|
| Power ON -> Booting complete | 53 seconds | 8 seconds |
| Booting -> OS complete | 73 seconds | 58 seconds |

First, a time of 8 seconds is taken from execution of the boot loader to completion of the booting stage in the case where the secure image process is not performed, but a time of 53 seconds is taken when the secure image process is performed. Here, the additionally taken time is to implement the emergency restoration mode of the firmware image, and a time of 43 seconds is additionally taken in the booting stage since the emergency restoration mode is performed through a single thread.

After the booting stage complete is completed, a time of 58 seconds is taken in the case that the secure image process is not performed until an OS is executed to enter the OS stage. In the case that the secure image process is performed, a time of 73 seconds is taken, and this shows that a time of 15 seconds is additionally taken to perform upgrading or automatic restoration mode for the firmware image. That is, only 15 seconds are further taken as a result from upgrading the firmware image through multi threads in the OS stage In brief, in the case where both the emergency restoration and the upgrading of the firmware image are performed in the booting stage like a related art electronic device, a total time of 45 seconds is taken as a result from the process through the single thread. On the other hand, in the case where the emergency restoration for the firmware image is performed in the booting stage and the upgrading mode for the firmware image is performed in the OS stage, a time of only 15 seconds is further taken as a result from the process using the multi threads in the OS stage, thereby shortening the time taken in the secure image process.

As described above, the electronic device 100 according to an exemplary embodiment may include any publicly known digital electronic device that operates using the firmware, and may include, for example, a set-top box as a digital broadcasting receiver and a digital television (DTV) as a display device for displaying a video signal. Below, referring to FIGS. 3A and 3B and FIGS. 4A and 4B, an exemplary embodiment where the electronic device is achieved by the display device or the set-top box, and an exemplary embodiment where an alert function is provided to a user in the emergency restoration mode and the upgrading mode will be described.

Figure 3A:
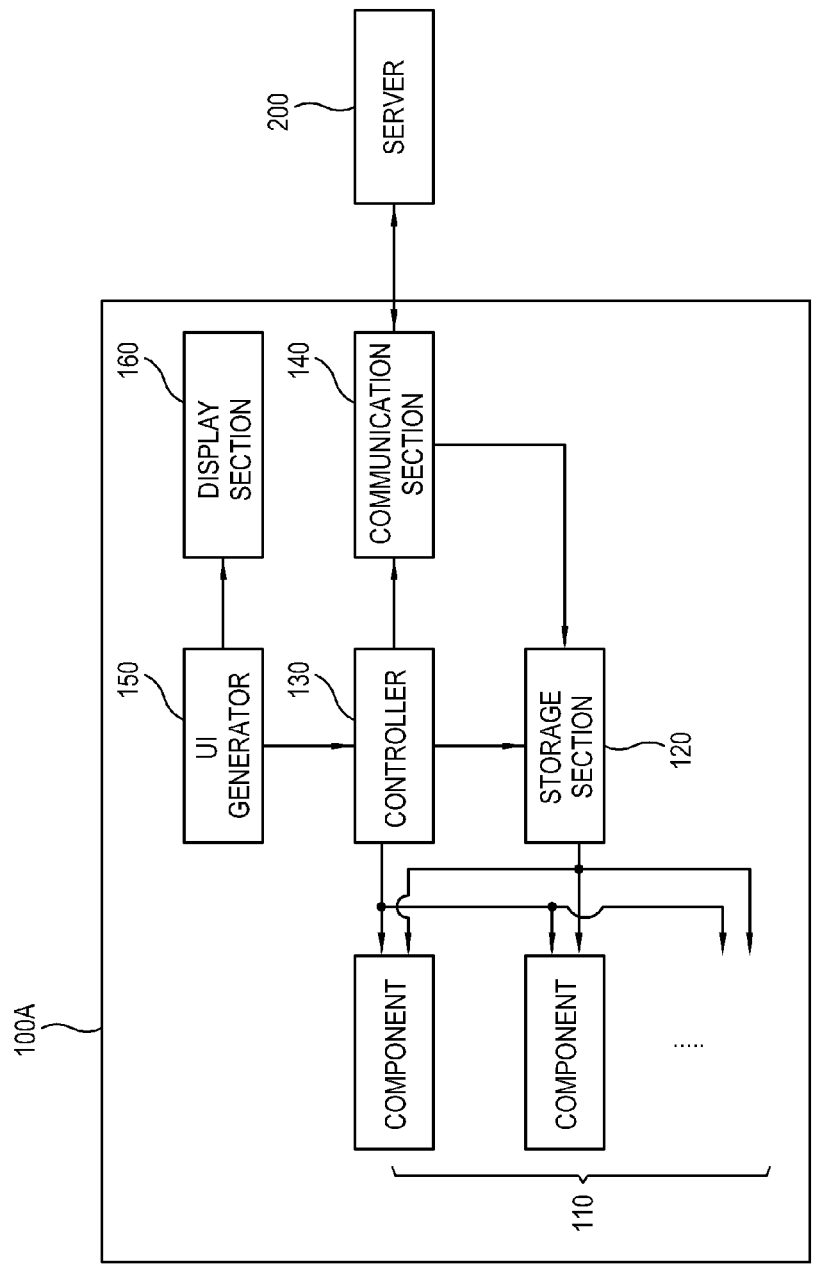
FIGS. 3A and 4A are control block diagrams of an electronic device according to an exemplary embodiment.

FIG. 3A is a control block diagram in the case where the electronic device 100 according to an exemplary embodiment is achieved by the display device. As shown therein, an electronic device 100A according to this exemplary embodiment includes a plurality of components 110, a controller 130, a storage section 120, a communication section 140, a user interface (UI) generator 150, and a display section 160. Here, the plurality of components 110, the controller 130, the storage section 120 and the communication section 140 are configured to have the same characteristics as those described in FIG. 1, and thus descriptions thereof will be omitted.

The display section 160 displays an image based on a video signal. The image displayed on the display section 160 includes an image based on an input broadcasting signal, an image based on a signal received from a connected external source, and a graphic image generated by the UI generator 150 to be described later. There is no limit to the type of display section 160, and the display section 160 may be a liquid crystal, a plasma, a light-emitting diode, an organic light-emitting diode, or the like, but is not limited thereto. As necessary, a publicly known configuration for displaying an image may be further added.

Also, the electronic device 100A may further include a video receiver (not shown) which receives a radio frequency (RF) signal transmitted from a broadcasting station or receives a video signal based on standards such as composite video, component video, super video, Syndicat des Constructeurs d'Appareils Radiorécepteurs et Téléviseurs (SCART), high definition multimedia interface (HDMI), etc. in order to receive a video signal displayed on the display section 160; and a video processor (not shown) which performs video processes such as decoding corresponding to various video formats, deinterlacing, frame refresh rate conversion, scaling, noise reduction for improving image quality, detail enhancement, etc. in order to display the received video signal on the display section 160.

Figure 3B:
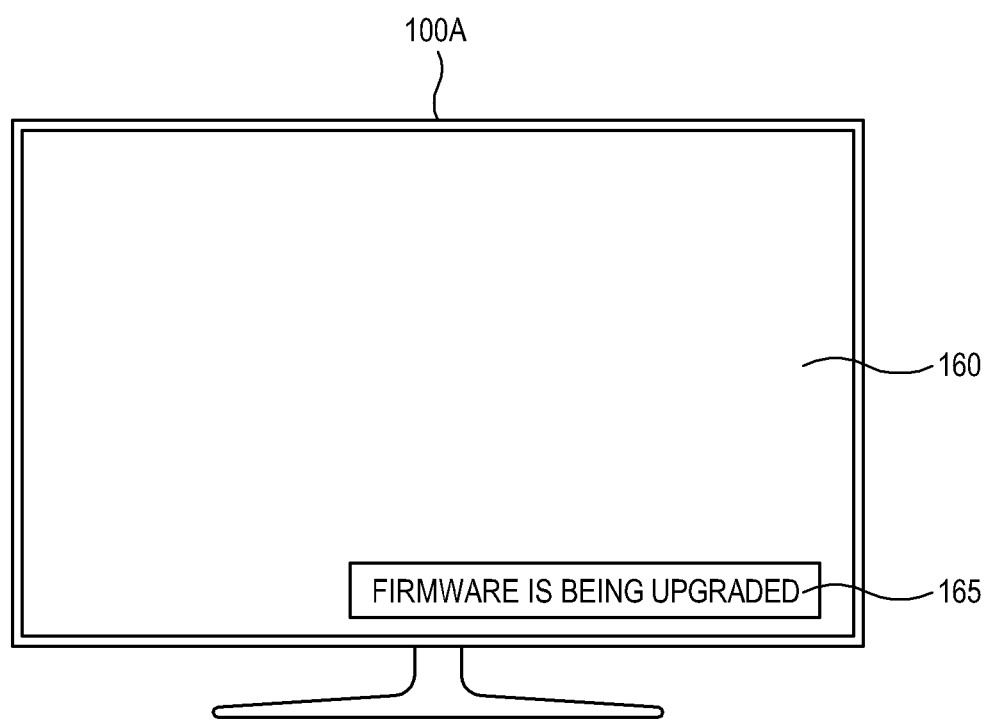
FIGS. 3B and 4B are views showing exemplary embodiments in which an alert function is provided to a user through the electronic device.

If the electronic device 100A operates in the emergency restoration mode or the upgrading mode for the firmware image during the booting stage, the controller 130 controls the UI generator 150 to generate a UI for informing the emergency restoration mode or the upgrading mode. The UI generator 150 may be achieved by a hardware processor separately from the controller 130, or by software as a method where the controller 130 executes an application program stored in the storage section 120. The UI image generated by the UI generator 150 is displayed on the display section 160 as shown in FIG. 3B (165), and a separate icon, image or the like may be displayed besides a text form.

Figure 4A:
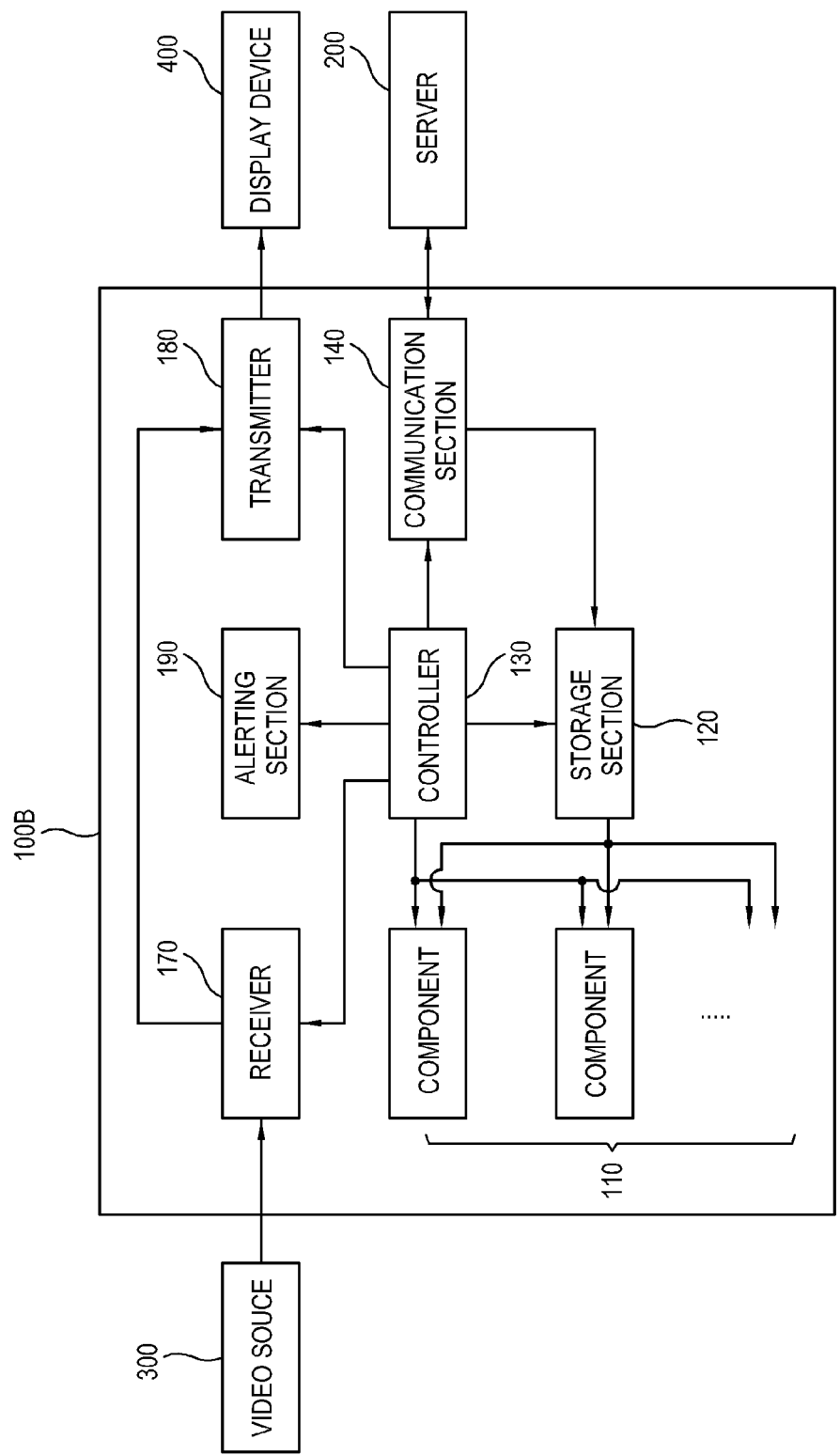

FIG. 4A is a control block diagram in a case where the electronic device 100 according to an exemplary embodiment is achieved by the set-top box. As shown therein, an electronic device 100B in this exemplary embodiment includes a plurality of components 110, a controller 130, a storage section 120, a communication section 140, a receiver 170, a transmitter 180, and an alerting section 190.

Here, the plurality of components 110, the controller 130, the storage section 120 and the communication section 140 are configured to have the same characteristics as those described in FIG. 1, and thus descriptions thereof will be omitted.

The receiver 170 receives a video signal from a video source 300. The receiver 170 may wirelessly receive a radio frequency (RF) signal from a broadcasting station, or may receive a video signal based on standards such as composite video, component video, super video, Syndicat des Constructeurs d'Appareils Radiorécepteurs et Téléviseurs (SCART), high definition multimedia interface (HDMI), etc. through a cable. The transmitter 180 processes a video signal and transmits the processed signal to the display apparatus. The transmitter 180 transmits a video signal to the display apparatus connected through a digital visual interface (DVI), a high definition multimedia interface (HDMI), or the like interface.

Figure 4B:
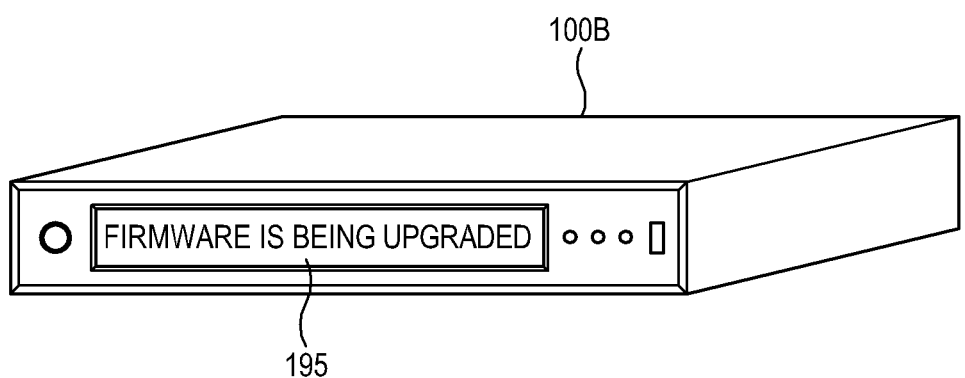

The alerting section 190 may be provided in a front of the electronic device 100B, and serves to give predetermined information about operations of the electronic device 100B to a user under control of the controller 130. In particular, when the firmware image is being restored or upgraded, alert 195 for alerting the emergency restoration or upgrading is provided as shown in FIG. 4B. The alerting section 190 may be achieved in various forms such as a liquid crystal screen, a plurality of dotted light emitting diodes, etc.

Figure 6:
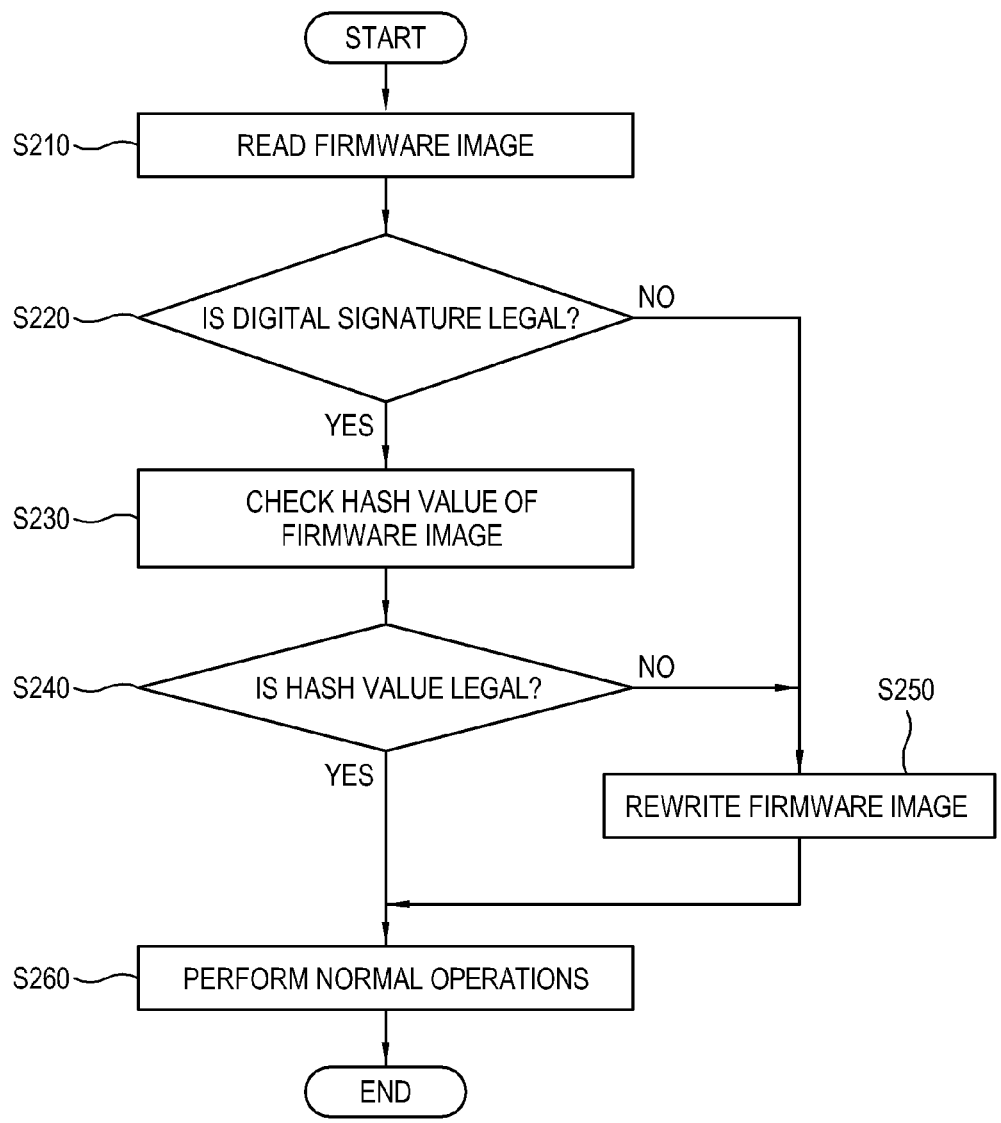

FIGS. 5 and 6 are flowcharts of firmware upgrading methods for an electronic device according to an exemplary embodiment.

As described above, the electronic device according to an exemplary embodiment may include any publicly known digital electronic device that operates using the firmware. The electronic device may be a set-top box for receiving digital broadcasting, and a display apparatus such as a digital television (DTV), etc. for displaying a video signal. The electronic device includes a plurality of components for performing the respective functions thereof, for example, an infra-red (IR) module, a graphic card, a video and audio codec, a Wi-Fi module, etc.

The electronic device executes the boot loader to enter the booting stage (S110).

In the booting stage, it is determined whether the firmware image is damaged. Here, in order to determine whether the firmware image is damaged, a query to check the version information of the firmware image is executed (operation S120) and it is determined whether the firmware image is damaged in accordance with checks of the version information (operation S130). If there is no response to the query, it is determined that the firmware image is damaged. The version information is included in the header of the firmware image, and it is thus determined that the firmware image is broken or is in an inoperative state due to failure during upgrading if there is no response to the version information query.

In this case, it is possible to enter the emergency restoration mode and restore the damaged firmware image with the firmware image received from the external source (operation S140). Also, during the emergency restoration of the firmware image, the alert corresponding to this may be displayed as shown in FIG. 3B or 4B (operation S150).

When the version information is checked, the electronic device may store the version information in a separate area of the memory in order to upgrade the firmware image in the following OS stage (operation S160).

If the emergency restoration mode is executed in the booting stage, the operation of the electronic device operates through a single thread. That is, during the emergency restoration mode, other operations are not performed until the firmware image is completely restored. The OS is loaded after the emergency restoration is completed, and then the electronic device performs normal operations after entering the OS stage.

If the emergency restoration of the firmware image is completed or the firmware images of the components are not at all damaged, the electronic device loads the OS and enters the OS stage.

After entering the OS stage, it is determined whether to upgrade the firmware image. To this end, the stored version information is compared with the version information of the firmware image received from the external source (operation S170). If the stored version information of the firmware image is lower than the version information of the firmware image received from the external source, the upgrading mode starts to receive the firmware image from the external server and upgrades the firmware image with the received firmware image (operation S180). According to an exemplary embodiment, the electronic device receives the firmware image from the external source by the OTA method, and the external server which transmits the firmware image, which is a server prepared by a provider or manager of the electronic device, transmits the version information of the firmware image and the firmware image to the electronic device in response to requests from the electronic device.

The electronic device may display an alert for alerting a user that the electronic device is in the upgrading mode (operation S190).

FIG. 6 is a flowchart showing a method of verifying the firmware image.

According to an exemplary embodiment, the firmware image may include a hash value obtained using a hash function, and a digital signature of the hash value, which are the same as described above in detail with reference to FIG. 2. When receiving the firmware image from an external server, i.e., from a provider in the booting stage, the electronic device may perform the validity verification process of the secure image.

The electronic device reads the secure image from the memory (operation S210), and determines whether the digital signature of the secure image is legal (operation S220). As described above, the digital signature is generated by signing not the whole of the firmware image, but the hash value of the firmware image.

At this time, through a public key provided from a secure image provider by a public key based structure, it is possible to determine whether the digital signature is legally signed with a private key of the secure image provider. Through the foregoing process, it is possible to verify whether the secure image is an image provided by the secure image provider via a legal route. If the digital signature is illegal, it is determined that the corresponding secure image 10 is not provided from a legal route, but is instead provided from an illegal route by a hacking process or the like.

If the secure image is legal, the hash value of the firmware image is obtained to check whether the hash value is legal (operation S240). As described above, the same mapping is impossible with regard to the hash values from different codes, the hash value received separately from the secure image provider or previously stored is compared with the hash value of the firmware image, thereby verifying that the corresponding firmware image is not modified or modulated, but is an original firmware image. The foregoing process of inspecting the hash value may be applied even when the automatic restoration mode operates in the OS stage.

If the hash value is legal, the electronic device normally operates through the OS (operation S260).

By the foregoing method, if the digital signature is illegal or the identity of the hash value of the firmware image is not accepted, the electronic device requests the secure image provider to retransmit the secure image and the re-received secure image repeatedly, and repeatedly undergoes the verification process. Thus, the existing secure image can be rewritten and replaced with the verified secure image (operation S250).

According to the foregoing exemplary embodiments, it is possible to not only assure security of the firmware image, but also to secure a service providing time of the electronic device.

As described above, according to an exemplary embodiment, there are provided an electronic device and a firmware upgrading method thereof, which can assure security and minimize a service interruption time when a firmware image required for operations of the electronic device is restored or upgraded.

Although a few exemplary embodiments have been shown and described, it will be appreciated by those skilled in the art that changes may be made in these exemplary embodiments without departing from the principles and spirit of the application, the scope of which is defined in the appended claims and their equivalents.

What is claimed is:
1. An electronic device comprising:
    a storage section configured to store a firmware image; and
    a controller, during a booting stage, configured to:
        execute a boot loader of the electronic device;
        execute a query to check version information of the firmware image to determine whether the firmware image is damaged and perform a restoration function for the firmware image if a response to the query is not received; and
        store version information of the firmware image in the storage section,
        wherein the controller, during an operating system (OS) stage, is configured to, while an OS performs normal operation, determine whether the restoration function is performed for the damaged firmware image and upgrade the restored firmware image if the upgrade of the restored firmware image is needed.
2. The electronic device according to claim 1, further comprising a plurality of components configured to perform functions of the electronic device, wherein
    the storage section is configured to store the firmware images which respectively correspond to the plurality of components, and
    the controller is configured to perform the restoration function for the damaged firmware image during a booting stage if at least one of the firmware images corresponding to the plurality of components is damaged.

3. The electronic device according to claim 2, wherein the controller, during the operating system (OS) stage, is configured to compare the version information of the firmware image stored in the storage section with version information of the firmware image received from an external source, and upgrade the firmware image stored in the storage section with the firmware image received from the external source when the version information of the firmware image stored in the storage section is lower than the version information of the firmware image received from the external source.

4. The electronic device according to claim 3, further comprising a communication section configured to communicate with an external server which provides the firmware image.

5. The electronic device according to claim 4, wherein the firmware image stored in the storage section is upgraded while the OS is running.

6. The electronic device according to claim 5, wherein the firmware image stored in the storage section comprises a hash value which is obtained from the firmware image stored in the storage section through a hash function, and a digital signature of the hash value.

7. The electronic device according to claim 6, wherein the controller is configured to decrypt the digital signature of the hash value to determine whether the digital signature of the hash value is legal, and upgrade the firmware image stored in the storage section with the firmware image provided from the external server if the digital signature is illegal.

8. A firmware upgrading method of an electronic device, the method comprising:
   executing a boot loader;
   querying version information of a firmware image stored in the electronic device;
   determining that the firmware image in the electronic device is damaged if a
   response to the query is not received;
   during a booting stage, performing a restoration function for the firmware image when the firmware image is damaged and storing version information of the firmware image in the electronic device; and
   while an operating system (OS) performs normal operations, during an OS stage, determining whether the restoration function is performed for the damaged firmware image and upgrading the restored firmware image if an upgrade of the firmware image is needed.

9. The method according to claim 8, wherein the electronic device comprises a plurality of components provided for performing functions of the electronic device, and the electronic device stores firmware images respectively corresponding to the plurality of components, and
   the performing the restoration function for the firmware image in the electronic device comprises performing the restoration function for the damaged firmware image if at least one of the firmware images corresponding to the plurality of components is damaged.

10. The method according to claim 9, further comprising: comparing the version information of the firmware image stored in the electronic device with the version information of the firmware image received from an external source, and upgrading the firmware image stored in the electronic device with the firmware image received from the external source when the version information of the firmware image stored in the electronic device is lower than the version information of the firmware image received from the external source.

11. The method according to claim 10, wherein the upgrading the firmware image stored in the electronic device is performed while the OS of the electronic device is running.

12. The method according to claim 11, wherein the firmware image comprises:
   a hash value obtained from the firmware image stored in the electronic device through a hash function; and
   a digital signature of the hash value.

13. The method according to claim 12, wherein the upgrading the firmware image stored in the electronic device is performed by determining whether the digital signature for the hash value is legal after decrypting the digital signature, and upgrading the firmware image stored in the electronic device with the firmware image provided from the server if the digital signature is illegal.

14. A method for upgrading a firmware image stored in an electronic device, the method comprising:
   querying version information of the firmware image stored in the electronic device;
   determining that the firmware image stored in the electronic device is damaged if a response to the query is not received;
   storing the version information of the firmware image in the electronic device;
   during a booting stage, entering an emergency restoration mode to restore the damaged firmware when it is determined that the firmware stored in the electronic device is damaged;
   during an operating system (OS) stage, loading an operating system after determining that the restoring of the damaged firmware is completed, and
   upgrading the firmware stored in the electronic device if the version information of the firmware stored in the electronic device is lower than a firmware version received from an external server.

15. The method of claim 14, wherein the firmware image stored in the electronic device includes a hash value which is obtained based on a hash function, and a digital signature of the hash function.

* * * * *